(12) United States Patent
Bamford et al.

(10) Patent No.: US 7,120,651 B2
(45) Date of Patent: Oct. 10, 2006

(54) MAINTAINING A SHARED CACHE THAT HAS PARTITIONS ALLOCATED AMONG MULTIPLE NODES AND A DATA-TO-PARTITION MAPPING

(75) Inventors: Roger J. Bamford, Peterborough, NH (US); Sashikanth Chandrasekaran, Chennai, TN (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 307 days.

(21) Appl. No.: 10/831,248

(22) Filed: Apr. 23, 2004

(65) Prior Publication Data

US 2004/0215883 A1  Oct. 28, 2004

Related U.S. Application Data

(63) Continuation-in-part of application No. 10/665,062, filed on Sep. 17, 2003, and a continuation-in-part of application No. 10/718,875, filed on Nov. 21, 2003, now Pat. No. 6,845,384.

(51) Int. Cl.
*G06F 12/16* (2006.01)
*G06F 13/00* (2006.01)

(52) U.S. Cl. ............... 707/201; 711/129; 711/141; 711/202; 711/216; 710/200; 710/240; 714/13; 714/15; 709/217

(58) Field of Classification Search .......... 714/13, 714/15, 16; 711/129, 135, 141, 143, 144, 711/145, 152, 153, 170, 173, 202, 206, 216, 711/217, 112; 710/200, 240; 707/201; 709/217
See application file for complete search history.

(56) References Cited

U.S. PATENT DOCUMENTS 4,827,411 A   5/1989  Arrowood et al.
4,873,517 A   10/1989 Baratz et al.
4,914,571 A   4/1990  Baratz et al.
4,972,437 A   11/1990 Citron et al.
5,101,348 A   3/1992  Arrowood et al.

(Continued)

FOREIGN PATENT DOCUMENTS

CA     2 435 388 A1     1/2003

(Continued)

OTHER PUBLICATIONS

International Preliminary Examining Authority, "Notification of Transmittal of the International Preliminary Report of Patentability," PCT/US2004/024425, dated Feb. 6, 2006, 6 pages.

(Continued)

*Primary Examiner*—Hong Kim
(74) *Attorney, Agent, or Firm*—Hickman Palermo Truong & Becker LLP

(57) ABSTRACT

Various techniques are described for improving the performance of a multiple node system by allocating, in two or more nodes of the system, partitions of a shared cache. A mapping is established between the data items managed by the system, and the various partitions of the shared cache. When a node requires a data item, the node first determines which partition of the shared cache corresponds to the required data item. If the data item does not currently reside in the corresponding partition, the data item is loaded into the corresponding partition even if the partition does not reside on the same node that requires the data item. The node then reads the data item from the corresponding partition of the shared cache.

32 Claims, 9 Drawing Sheets

U.S. PATENT DOCUMENTS

| | | | |
|---|---|---|---|
| 5,109,483 | A | 4/1992 | Baratz et al. |
| 5,313,051 | A | 5/1994 | Brigida et al. |
| 5,319,773 | A | 6/1994 | Britton et al. |
| 5,432,926 | A | 7/1995 | Citron et al. |
| 5,539,883 | A | 7/1996 | Allon et al. |
| 5,613,060 | A | 3/1997 | Britton et al. |
| 5,675,791 | A | 10/1997 | Bhide et al. |
| 5,740,362 | A | 4/1998 | Buickel et al. |
| 5,845,326 | A * | 12/1998 | Hirayama et al. .......... 711/135 |
| 5,892,754 | A | 4/1999 | Kompella et al. |
| 6,011,918 | A | 1/2000 | Cohen et al. |
| 6,088,758 | A * | 7/2000 | Kaufman et al. .......... 711/100 |
| 6,253,229 | B1 | 6/2001 | Nielsen et al. |
| 6,311,265 | B1 | 10/2001 | Beckerle et al. |
| 6,321,238 | B1 | 11/2001 | Putzolu |
| 6,341,340 | B1 | 1/2002 | Tsukerman et al. |
| 6,370,619 | B1 | 4/2002 | Ho et al. |
| 6,438,714 | B1 | 8/2002 | Canestaro et al. |
| 6,453,404 | B1 * | 9/2002 | Bereznyi et al. ............ 711/171 |
| 6,480,895 | B1 | 11/2002 | Gray et al. |
| 6,567,509 | B1 | 5/2003 | Gusler et al. |
| 6,567,811 | B1 | 5/2003 | Edwards et al. |
| 6,611,899 | B1 * | 8/2003 | Takahashi et al. .......... 711/119 |
| 6,636,248 | B1 | 10/2003 | Christensen et al. |
| 6,711,571 | B1 | 3/2004 | Putzolu |
| 6,978,279 | B1 * | 12/2005 | Lomet et al. ................ 707/202 |
| 6,981,104 | B1 * | 12/2005 | Prabhu ....................... 711/144 |
| 2003/0041215 | A1 * | 2/2003 | George et al. .............. 711/141 |
| 2004/0172422 | A1 | 9/2004 | Putzolu |
| 2004/0215640 | A1 | 10/2004 | Bamford et al. |

FOREIGN PATENT DOCUMENTS

| | | |
|---|---|---|
| WO | WO 97/04384 A | 2/1997 |
| WO | WO 99/44130 A | 9/1999 |
| WO | WO 02/073416 A | 9/2002 |
| WO | WO 2005/013155 A1 | 2/2005 |

OTHER PUBLICATIONS

Current Claims, PCT/US2004/024425, 4 pages.
International Searching Authority, "Written Opinion of the International Searching Authority," PCT/US2004/02555, mailing date Aug. 3, 2005, 11 pages.
Current Claims, PCT/US2004/02555, 7 pages.
Abdallah, Maha et al., "One-Phase Commit: Does It Make Sense?" IEEE (1998), pp. 182-192.
Chandrasekaran, Sashikanth et al., "Shared Cache—The Future of Parallel Databases" IEEE (2003), pp. 840-850.
Lee, Inseon, et al., "A Single Phase Distributed Commit Protocol for Main Memory Database Systems" IEEE (2002), 8 pages.
Samaras, George et al., "Two-Phase Commit Optimization and Tradeoffs in the Commercial Environment" IEEE (1993), pp. 520-529.
International Search Report for PCT/US2004/024451, 11 pages.
Michael Donald Dahlin, "Serverless Network File Systems," 1995, pp. 1-166.

* cited by examiner

MAINTAINING A SHARED CACHE THAT HAS PARTITIONS ALLOCATED AMONG MULTIPLE NODES AND A DATA-TO-PARTITION MAPPING

PRIORITY CLAIM/RELATED APPLICATIONS

This application claims the benefit of priority from U.S. Provisional Application Ser. No. 60/492,019 entitled "Shared Nothing on Shared Disk Hardware", filed Aug. 1, 2003, which is incorporated by reference in its entirety for all purposes as if fully set forth herein.

This application is a Continuation-in-Part of U.S. Application Ser. No. 10/665,062, entitled "Ownership Reassignment in a Shared-Nothing Database System," filed Sep. 17, 2003; and U.S. Pat. No. 6,845,384 B2, entitled "One-Phase Commit in a Shared-Nothing Database System," filed Nov. 21, 2003; which are incorporated by reference in their entirety for all purposes as if fully set forth herein.

This application is related to U.S. application Ser. No. 10/831,401, entitled "Dynamic Reassignment of Data Ownership," by Roger Bamford, Sashikanth Chandrasekaran and Angelo Pruscino, filed on the same day herewith, and U.S. application Ser. No. 10/831,413, entitled "Parallel Recovery by Non-Failed Nodes," by Roger Bamford, Sashikanth Chandrasekaran and Angelo Pruscino, filed on the same day herewith; both of which are incorporated by reference in their entirety for all purposes as if fully set forth herein.

FIELD OF THE INVENTION

The present invention relates to caches and, more specifically, to a partitioned shared cache.

BACKGROUND OF THE INVENTION

In general, a cache is a place for temporarily storing a thing so that the thing can be accessed more quickly and/or efficiently than is possible where the thing is normally stored. Within the context of computer systems, a cache is usually memory used for temporarily storing data so that the data can be accessed more quickly and/or efficiently than is possible in the memory in which the data normally resides. Thus, volatile memory is typically used to cache data that resides on non-volatile memory, such as magnetic disks. Similarly, fast volatile memory is typically used to cache data that resides in slower volatile memory. It is common for computer systems to use multiple levels of cache, where each level of cache is typically smaller and faster than the preceding level.

In systems that include multiple processing nodes, a centralized cache of volatile memory can be used by all of the nodes to cache data items that reside on non-volatile memory. Such centralized shared cache systems typically suffer from two problems. First, a centralized shared cache system can be a scalability bottleneck due to the fact that communication is required between each module of shared memory and every processing node in the system. Thus, the more nodes, the greater the expense of increasing memory, and the more memory, the greater the expense of adding more nodes.

Second, a centralized shared cache constitutes a single point of failure for all nodes in a shared everything system. Since the centralized shared cache serves to cache data for all nodes, cached data for every node may be lost by the failure of the single centralized cache. Because of the potential catastrophic effect of such a failure, the centralized shared cache is usually a specialized computer that is also possibly duplexed.

DISTRIBUTED CACHE SYSTEMS

Instead of a centralized shared cache, many multiple-node systems employ a distributed private cache system. Specifically, within such systems each node has its own separate memory for caching the data used by that node, and the memory is not made accessible to other nodes. Because each node has its own cache, the cost of increasing the cache is not affected by the number of nodes in the system. Similarly, the failure of any given cache does not affect the availability of the remaining caches.

However, in distributed private-cache systems, it is possible for one node's performance to degrade when the node works on a task that requires more data to be cached than can actually fit in the node's private cache. Such degradation will occur even if other nodes are performing tasks that have relatively small cache requirements. In these situations, there is no way for the node with the overloaded cache to make use of the memory of the underutilized caches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Various techniques are described hereafter for caching data in a partitioned centralized cache. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for treating memory within each of a plurality of nodes as a partitioned shared cache for the multiple-node system. Specifically, a portion of the memory of individual nodes is treated as a partition of a shared cache that can be used by one or more of the other nodes of the system. A portion of memory thus used is referred to herein as a "shared cache partition".

Because a node in the system may access data that is cached in that shared cache partition within another node's memory, dirty versions of data items may be easily accessed by new owners when ownership of the data items is transferred. However, because each of the shared cache partitions resides in a separate node, a partitioned shared cache does not have the disadvantages of conventional centralized caches. Specifically, a partitioned shared cache does not present the scalability problems associated with conventional centralized caches, nor does a partitioned shared cache constitute a single point of potentially catastrophic failure.

Exemplary Cluster that Includes a Partitioned Shared Cache

Figure 1:
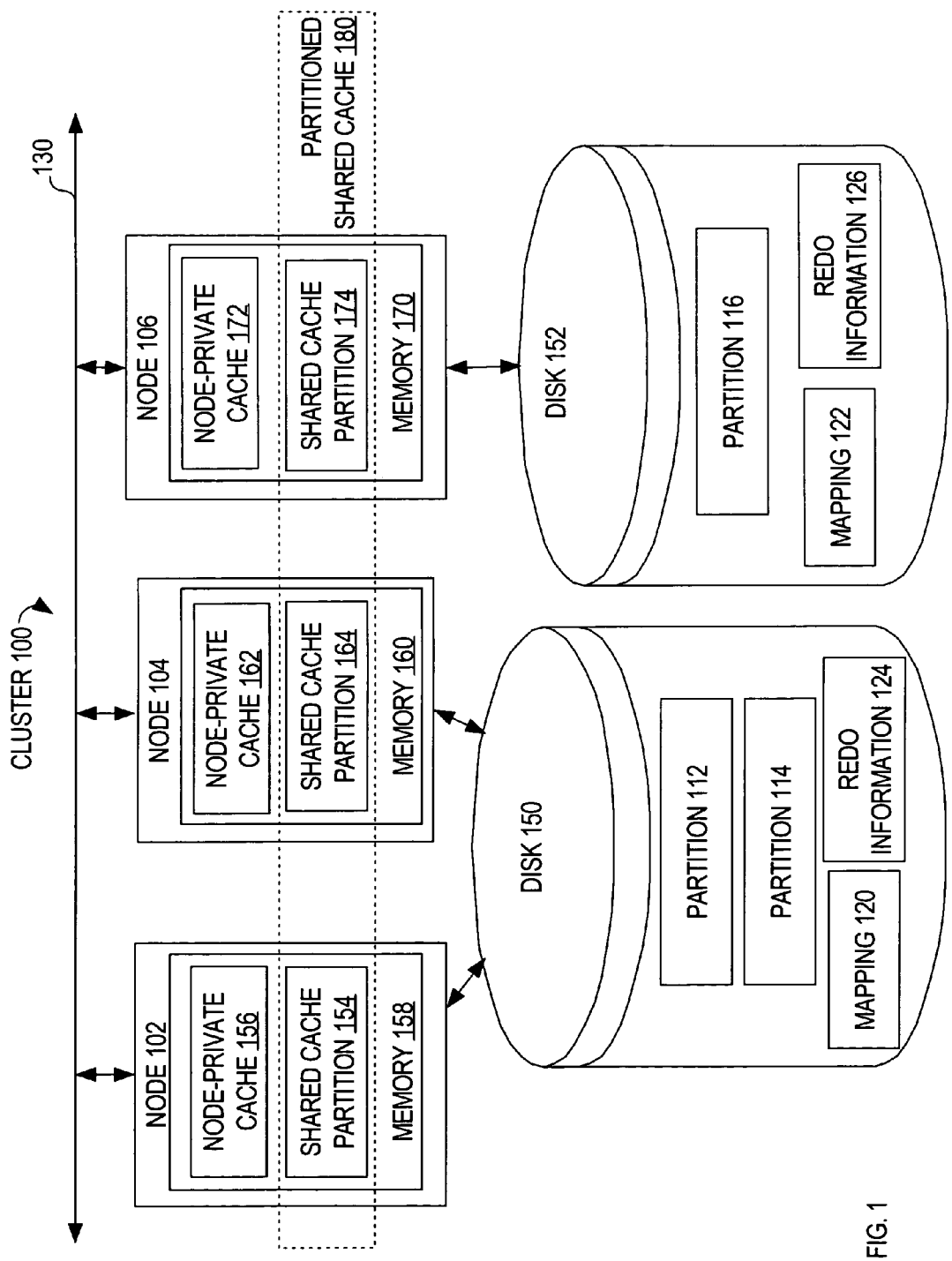
FIG. 1 is a block diagram illustrating a cluster that includes two shared disk subsystems, according to an embodiment of the invention.

FIG. 1 is a block diagram illustrating a cluster 100 upon which embodiments of the invention may be implemented. Cluster 100 includes three nodes 102, 104 and 106 that are coupled by an interconnect 130 that allows the nodes to communicate with each other. Cluster 100 includes two disks 150 and 152. Nodes 102 and 104 have access to disk 150, and node 106 has access to disk 152. Cluster 100 is an example of a relatively simple system. Actual systems may be much more complex than cluster 100, with hundreds of nodes, hundreds of shared disks, and many-to-many relationships between the nodes and shared disks.

Partitioned Shared Cache

For the purpose of illustration, it shall be assumed that a database system is running on cluster 100, where the database managed by the database system is stored on disks 150 and 152. In the illustrated system, the data is segregated into three groups or partitions 112, 114 and 116. However, such partitioning is not required by the techniques described herein. Rather, the shared-cache partitions may be created independent of the physical location of the blocks on disk. Thus, two consecutive blocks on disk may be mapped to two different shared-cache partitions.

Each node of cluster 100 has volatile memory in which a portion of memory space is used as a shared cache partition, and another portion of memory space is used as a node-private cache. Specifically, nodes 102, 104 and 106 respectively include memories 158, 160 and 170. Memory 158 includes a node-private cache 156 and a shared cache partition 154. Memory 160 includes a node-private cache 162 and a shared cache partition 164. Memory 170 includes a node-private cache 172 and a shared cache partition 174. Shared cache partitions 154, 164 and 174 collectively constitute a partitioned shared cache 180 for cluster 100.

While every node in cluster 100 includes a partition of shared cache 180, the techniques described herein may be used in systems where the partitions of the shared cache are spread across fewer than all of the nodes of the cluster. It may be desirable to not have a partition of the shared cache on a node if, for example, the memory resources available on the node are smaller or more heavily taxed than memory resources on the other nodes. Further, the actual size of each shared cache partition may vary from node to node, depending on various factors such as the amount of memory available in the node.

In the illustrated embodiment, each node has both a node-private cache and a partition of the shared cache. However, in alternative embodiments, nodes do not have private caches. For example, in one alternative embodiment, nodes only have the shared-cache partition and not the node private cache. Further, the shared cache partitions and node private caches can be segregated into separate nodes. For example, a system with ten processing nodes may be configured such that each node has a private cache, but only four of the ten have a partition of the shared-cache. Alternatively, the four shared-cache nodes may not have their own private caches.

According to some embodiments, the nodes which have the shared-cache partitions have different characteristics than the processing nodes. For example, more reliable hardware configurations may be used for the shared-cache nodes than the processing nodes, and can also use non-volatile RAM to reduce the chance of data loss.

Establishing the Data-to-partition Mapping

Because shared cache 180 is partitioned, it is necessary to know which partition is responsible for holding which data items. Various techniques may be used to establish the partition-to-data mapping. For example, in one embodiment, a simple hashing algorithm is used to establish the mapping, where each partition of shared cache 180 is assigned one or more distinct hash values. Thus, when a data item is to be loaded into shared cache 180, a hash function is applied to an identifier associated with the data item to produce a hash value. The particular partition of shared cache 180 into which the data item is loaded is the partition to which the resulting hash value has been assigned.

According to one embodiment, the connectivity between nodes and non-volatile storage devices is one factor used to determine the partition-to-data mapping. For example, in one embodiment, the partition-to-data mapping is established in such a way that the partition in any given node is only used to cache data items that reside in non-volatile storage that is directly accessible to the node. For example, partitions 154 and 164 would be used to cache data items that reside on disk 150, but not data items that reside on disk 152. Similarly, partition 174 may be used to cache data items that reside on disk 152, but not data items that reside on disk 150. Such a mapping may be established, for example, by using disk # as part of the partitioning key.

According to an embodiment, each disk (e.g. disk 150 and disk 152) maintains a mapping, such as mapping 120 on disk 150 and mapping 122 on disk 152.

Using the Partitioned Shared Cache

According to one embodiment, partitioned shared cache 180 is used by the nodes of cluster 100 in a manner similar to how a non-partitioned centralized cache is used. For example, when node 102 requires a data item, node 102 looks for the data item in the shared cache 180. If the data item does not currently reside in shared cache 180, then the data item is loaded into the shared cache 180, and node 102 retrieves the data item from the shared cache 180.

Unlike conventional centralized caches, shared cache 180 is made of several distinct partitions to which specific data items have been assigned. Therefore, prior to performing an operation involving cache 180, the appropriate partition of cache 180 is identified. The appropriate partition for an operation may be determined based on (1) the data involved in the operation, and (2) the data-to-partition mapping. For example, if a hashing technique is used to establish the partition-to-data mapping, then the appropriate partition of shared cache 180 is determined by applying a hash function to the identifier associated with the data item involved in the operation. Once the appropriate partition is identified, the cache operation is performed using that partition.

Example Read Operation Using the Partitioned Cache

For the purpose of explanation, an example shall be given in which node 102 requires a data item where (1) the data item maps to partition 164 and (2) partition 164 does not currently contain a copy of the data item. Initially, node 102 determines that partition 164 is the appropriate partition based on the identifier of the required data item. Once it is determined that partition 164 is the appropriate partition, node 104 searches partition 164 for the desired data item. Upon discovering that partition 164 does not contain a copy of the desired data item, node 104 loads a copy of the data item into partition 164. Node 102 is then provided the data item from partition 164. Node 102 may, for example, store the data item from partition 164 into the node-private cache 156 of node 102.

Handling Updates Using the Partitioned Cache

Once a node has loaded a copy of a data item into its node-private cache, the node may perform an update to the data item. Under these circumstances, the updated version of the data item is said to be "dirty". For example, assume that, after reading a copy of the data item into node-private cache 156, node 102 makes a change to the copy of the data item that resides in node-private cache 156. Under these circumstances, the copy of the data item that resides in node-private cache 156 is dirty.

It is possible for one node (a "requesting" node) to request a data item that has been dirtied by another node (the "updating" node). According to one embodiment, under these circumstances the appropriate partition of the shared cache 180 is used to transfer the dirty version of the data item from the node-private cache of the updating node to the node-private cache of the requesting node. For example, assume that node 106 requests the data item after node 102 has updated the data item. In response to the request, the dirty version of the data item is copied from node-private cache 156 to partition 164, and node 106 reads the dirty data item from partition 164 into node-private cache 172. The node that is sending the dirty data item flushes the redo for any changes it may have made to the data item to persistent storage before sending that data item to another node.

Cache Management

Typically, changes made to a data item in volatile memory ultimately have to be reflected in the copy of the data item that resides on disk. According to one embodiment, each partition of the shared cache is responsible for writing out to disk the dirty data items that belong to that partition. Similarly, each partition is responsible for sending lock invalidation messages to nodes holding a read or write copy of the data item.

Depending on the nature of the system in which the partitioned shared cache resides, it may be necessary to coordinate access to the data item through the use of locks. In systems where locks are required, various lock data structures may be used to store information about the locks, such as who currently owns locks on the data item, who has requested locks on the data item, and what is the nature of the owned and requested locks. According to one embodiment, the lock data structures are maintained separately in each partition of the partitioned shared cache. Consequently, to avoid and/or resolve deadlocks, a cluster-wide deadlock detector gathers information from each of the partitions to build wait-for-graphs that include information from all of the partitions.

Cache Failure Recovery

As with any system, it is possible for the nodes of cluster 100 to fail. However, because the shared cache is distributed over several nodes, the failure of a single node does not cause the loss of the entire shared cache. Thus, when one of the partitions of the partitioned cache fails, only the data that is managed by that cache is inaccessible until it is recovered. Unlike centralized shared caches, the partition cache does not represent a single point of catastrophic failure.

According to one cache recovery technique, if a partition of the partitioned shared cache fails, then the contents of the partition can be reconstructed from the contents of the node-private cache (e.g. buffer) in the nodes that have cached current copies of blocks belonging to the failed partition. As in the case of a regular transfer (i.e. during normal run-time), the node which has the current copy flushes the redo for any changes it may have made to the block to persistent storage before sending a copy of the block to the partition that is being recovered. For example, disk 150 maintains redo information 124 for changes made to blocks in node 102 and node 104. Disk 152 maintains redo information 126 for changes made to blocks in node 106.

In some cases, the current copy of a data item may not be available if a dirty block was aged out from a node's private cache and was not transferred to another node's private cache before the failure of the partition. If the current copy of a block is not present in any surviving nodes' private caches, then the block is reconstructed by merging the online redo logs of all the nodes. Specifically, when a partition of the central shared cache is restarted, the online redo logs from all nodes are scanned. Any redo generated for a block that does not belong to the partition being recovered or for which the current copy was reconstructed in the partition using the contents of a node's private cache can be ignored. Otherwise, the merged redo is applied to the version of the block on disk to reconstruct the version of the block that existed in the partition before the failure.

It is possible that the on-disk version of a data item already includes the redo if the partition failed after writing a dirty block, but before a node could advance it's checkpoint past the redo that dirtied the block. Redo generated by different nodes is ordered through a log sequence number, which is a logical timestanp that is maintained using lamport clocks, as in other shared-disk and shared-cache systems.

The redo log scans and merges can happen in parallel to the nodes replay of the current copies of the blocks belonging to the failed partition. If the current copy is replayed before the redo for that block is merged, then the redo can be ignored. If the current copy is replayed after the old version of the block on disk has been read from disk and the merged redo has been applied, then the partition's copy of the block is replaced with the current copy that is replayed. In essence, the work of applying the redo is wasted.

Alternatively, the failed partition can be reconstructed solely from the redo logs, i.e. without replaying of current copies of the blocks. The replay of the current copies is simply an optimization to avoid reading the older version of the block from disk and applying the redo. If the current copies are not replayed, then the nodes still have to replay the lock state (i.e. whether they have exclusive or shared access) of the blocks to the partition. Finally, the partition of the shared cache does not need direct access to the nodes' redo logs. The redo logs can be read by the nodes and sent over a network to the partition during recovery.

According to one embodiment, to ensure that the redo needed for recovery of the partition is online and not overwritten, nodes are prevented from advancing their checkpoints (i.e. overwriting their redo) until the partition of the central shared cache has written to persistent storage a version of the block that contains the redo. The partitions of the central shared cache periodically write out dirty blocks and inform the nodes of the earliest unwritten change in the partition. A node can advance its checkpoint to a desired log sequence number, if the log sequence number is (1) before the log sequence number of the earliest unwritten change in all the partitions and (2) before the earliest change made to a dirty block in the node's private cache.

According to one embodiment, a checkpoint queue in the node, logically, contains entries for dirty blocks in the private cache as well as place-holders for changes that the node made to a block that has since been transferred to the partition of the shared cache. Using this technique, a node will be able to generate redo locally, flush the redo to local persistent storage and manage its checkpoint progress locally, while a remote partition is assigned the responsibility of writing out batches of dirty blocks to the database storage as well as reading the blocks from database storage on behalf of a requesting node.

Applications of a Partitioned Shared Cache

The techniques described herein are useful even in non-clustered systems, such as systems that would use networked storage systems. However, unlike networked storage systems, using techniques described herein, that latency sensitive writes to the redo log are performed locally and the partition can perform writes of the dirty blocks in batches. In contrast, networked storage systems can obtain the efficiency of batching disk I/Os only by buffering the writes in non-volatile memory.

Description of Drawings 3–9

Figure 3:
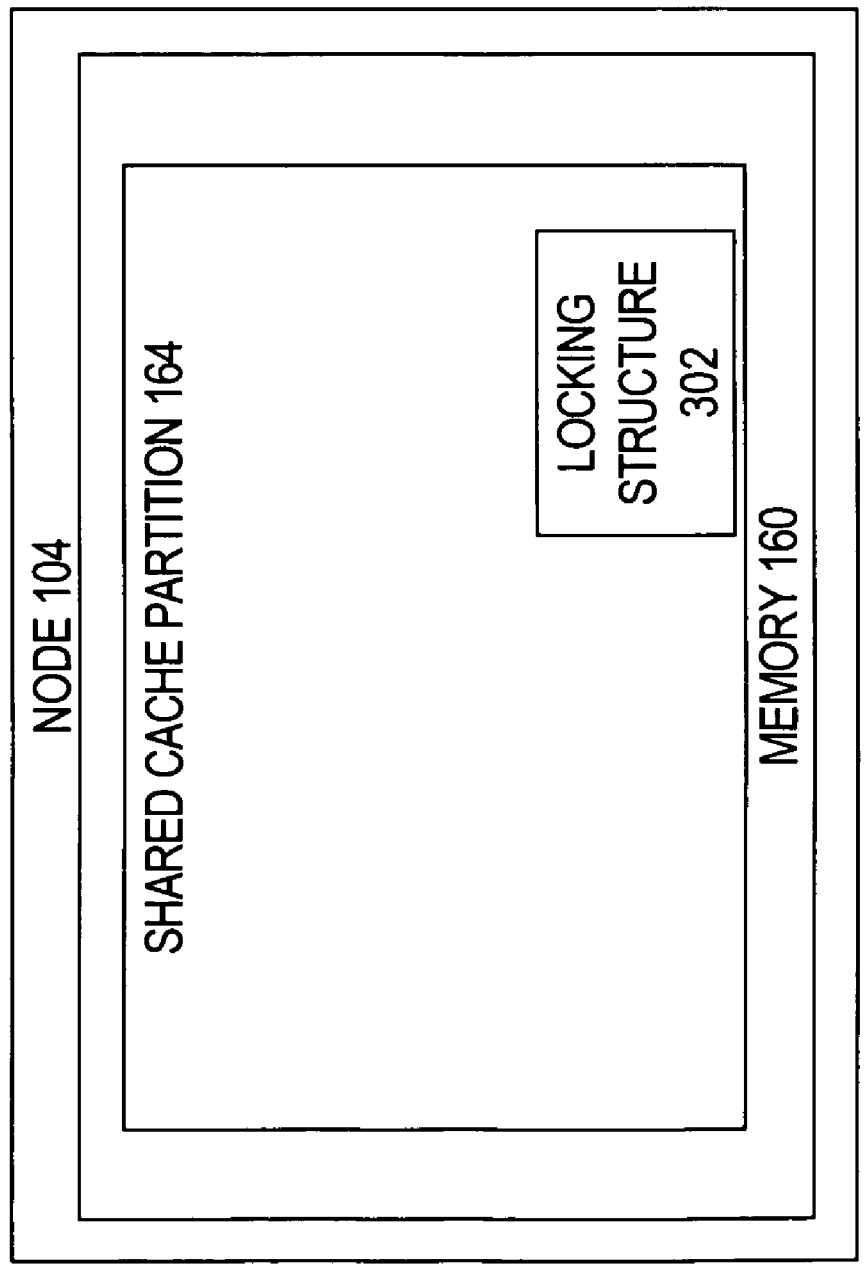
FIG. 3 is a block diagram of a locking structure in a node of a multimode system, according to an embodiment of the invention.

FIG. 3 is a block diagram of a locking structure in a node of a multimode system, according to an embodiment of the invention. Shared cache partition 164 in memory 160 of node 104 maintains locking structures, such as locking structure 302.

Figure 4:
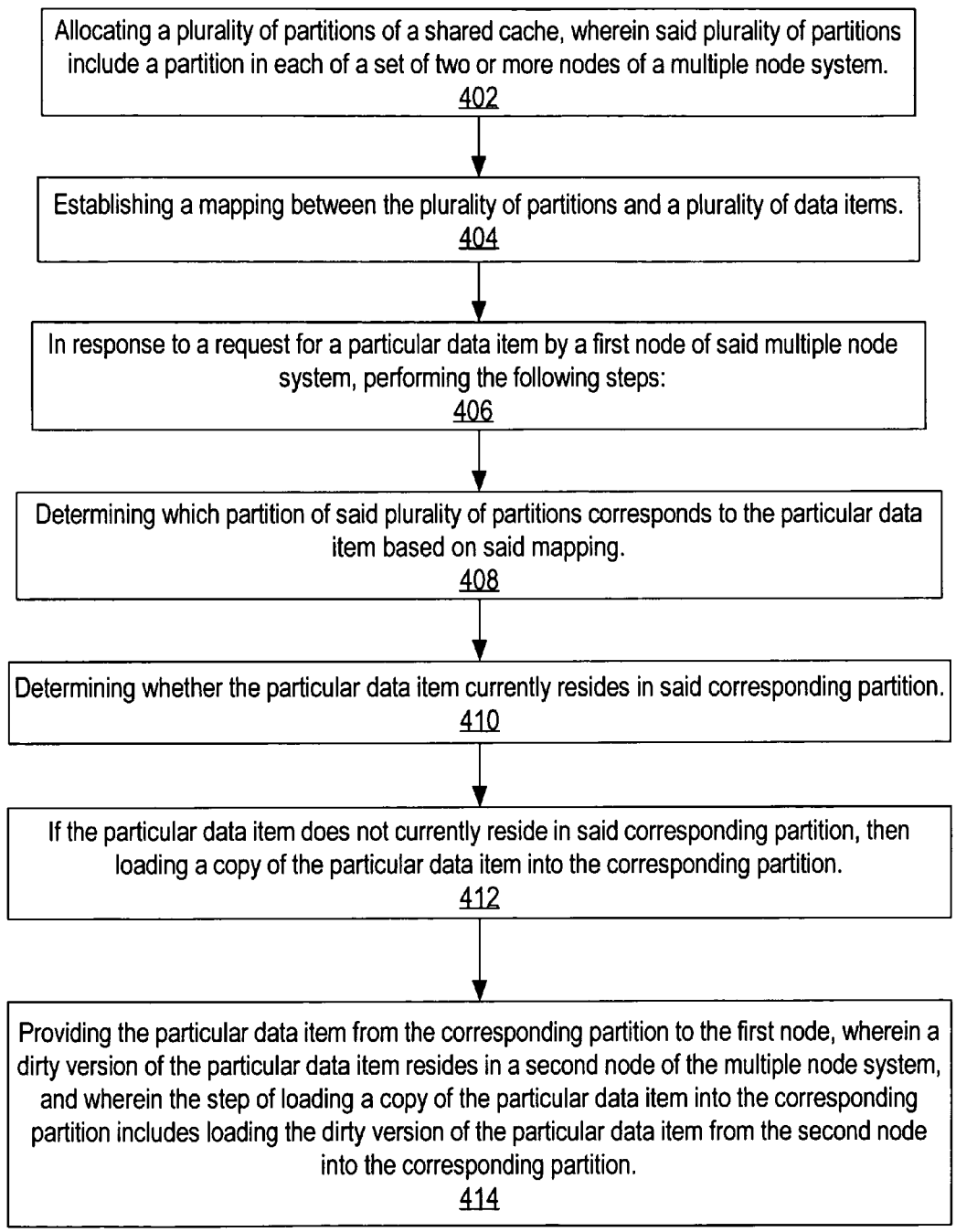
FIG. 4 is a flow diagram of a method for managing data, according to an embodiment of the invention.

FIG. 4 is a flow diagram of a method for managing data, according to an embodiment of the invention. At step 402, a plurality of partitions of a shared cache are allocated, wherein said plurality of partitions include a partition in each of a set of two or more nodes of a multiple node system. At step 404, a mapping is established between the plurality of partitions and a plurality of data items. At step 406, in response to a request for a particular data item by a first node of said multiple node system, the following steps are performed. At step 408, it is determined which partition of said plurality of partitions corresponds to the particular data item based on said mapping. At step 410, it is determined whether the particular data item currently resides in said corresponding partition. At step 412, if the particular data item does not currently reside in said corresponding partition, then a copy of the particular data item is loaded into the corresponding partition. At step 414, the particular data item is provided from the corresponding partition to the first node, wherein a dirty version of the particular data item resides in a second node of the multiple node system, and wherein the step of loading a copy of the particular data item into the corresponding partition includes loading the dirty version of the particular data item from the second node into the corresponding partition.

Figure 5:
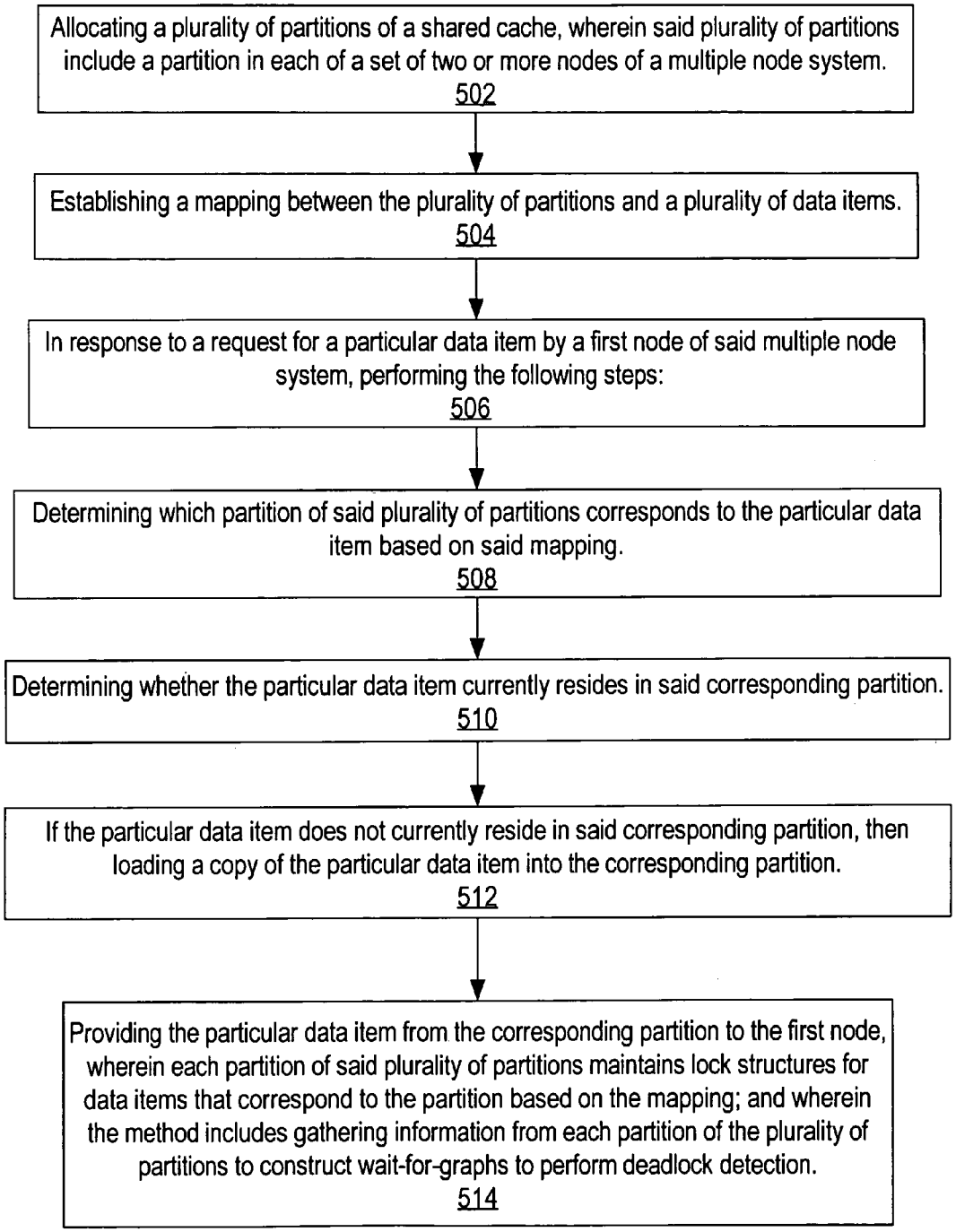
FIG. 5 is a flow diagram of a method for managing data, according to an embodiment of the invention.

FIG. 5 is a flow diagram of a method for managing data, according to an embodiment of the invention. At step 502, a plurality of partitions of a shared cache are allocated, wherein said plurality of partitions include a partition in each of a set of two or more nodes of a multiple node system. At step 504, a mapping is established between the plurality of partitions and a plurality of data items. At step 506, in response to a request for a particular data item by a first node of said multiple node system, the following steps are performed. At step 508, it is determined which partition of said plurality of partitions corresponds to the particular data item based on said mapping. At step 510, it is determined whether the particular data item currently resides in said corresponding partition. At step 512, if the particular data item does not currently reside in said corresponding partition, then a copy of the particular data item is loaded into the corresponding partition. At step 514, the particular data item is provided from the corresponding partition to the first node, wherein each partition of said plurality of partitions maintains lock structures for data items that correspond to the partition based on the mapping, and wherein the method includes gathering information from each partition of the plurality of partitions to construct wait-for-graphs to perform deadlock detection.

Figure 6:
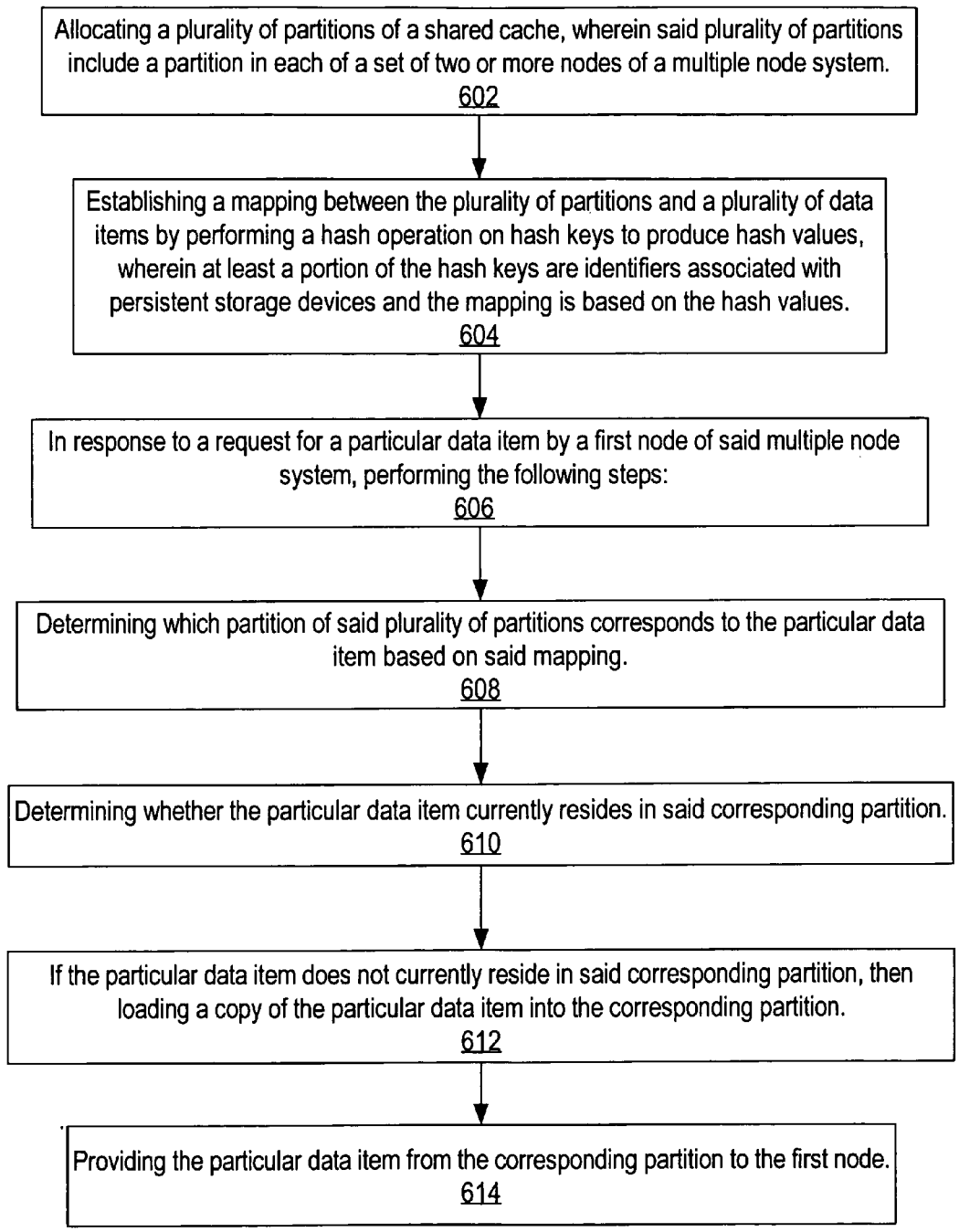
FIG. 6 is a flow diagram of a method for managing data, according to an embodiment of the invention.

FIG. 6 is a flow diagram of a method for managing data, according to an embodiment of the invention. At step 602, a plurality of partitions of a shared cache are allocated, wherein said plurality of partitions include a partition in each of a set of two or more nodes of a multiple node system. At step 604, a mapping is established between the plurality of partitions and a plurality of data items by performing a hash operation on hash keys to produce hash values, wherein at least a portion of the hash keys are identifiers associated with persistent storage devices and the mapping is based on the hash values. At step 606, in response to a request for a particular data item by a first node of said multiple node system, the following steps are performed. At step 608, it is determined which partition of said plurality of partitions corresponds to the particular data item based on said mapping. At step 610, it is determined whether the particular data item currently resides in said corresponding partition. At step 612, if the particular data item does not currently reside in said corresponding partition, then a copy of the particular data item is loaded into the corresponding partition. At step 614, the particular data item is provided from the corresponding partition to the first node.

Figure 7:
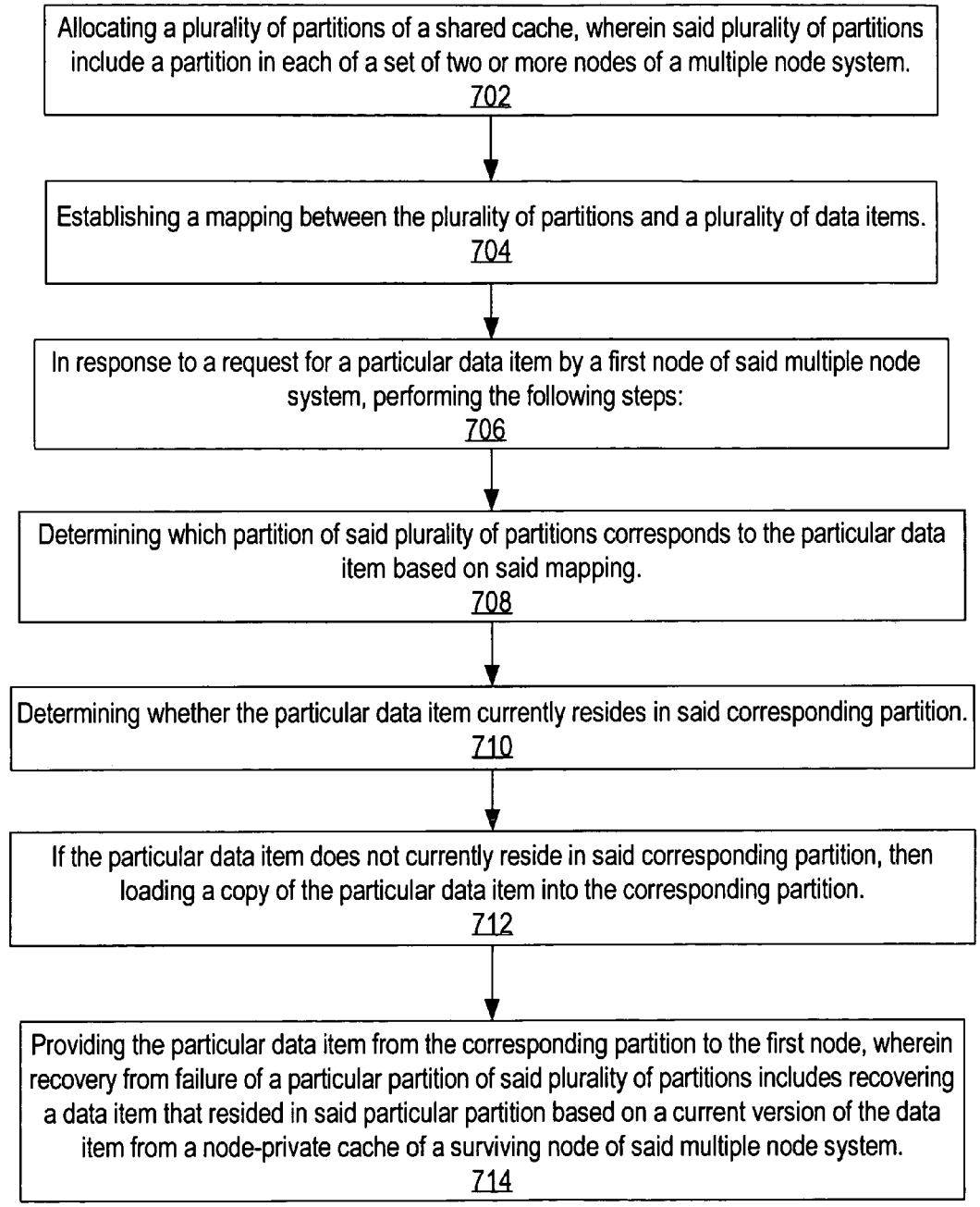
FIG. 7 is a flow diagram of a method for managing data, according to an embodiment of the invention.

FIG. 7 is a flow diagram of a method for managing data, according to an embodiment of the invention. At step 702, a plurality of partitions of a shared cache are allocated, wherein said plurality of partitions include a partition in each of a set of two or more nodes of a multiple node system. At step 704, a mapping is established between the plurality of partitions and a plurality of data items. At step 706, in response to a request for a particular data item by a first node of said multiple node system, the following steps are performed. At step 708, it is determined which partition of said plurality of partitions corresponds to the particular data item based on said mapping. At step 710, it is determined whether the particular data item currently resides in said corresponding partition. At step 712, if the particular data item does not currently reside in said corresponding partition, then a copy of the particular data item is loaded into the corresponding partition. At step 714, the particular data item is provided from the corresponding partition to the first node, wherein recovery from failure of a particular partition of said plurality of partitions includes recovering a data item that resided in said particular partition based on a current version of the data item from a node-private cache of a surviving node of said multiple node system.

Figure 8:
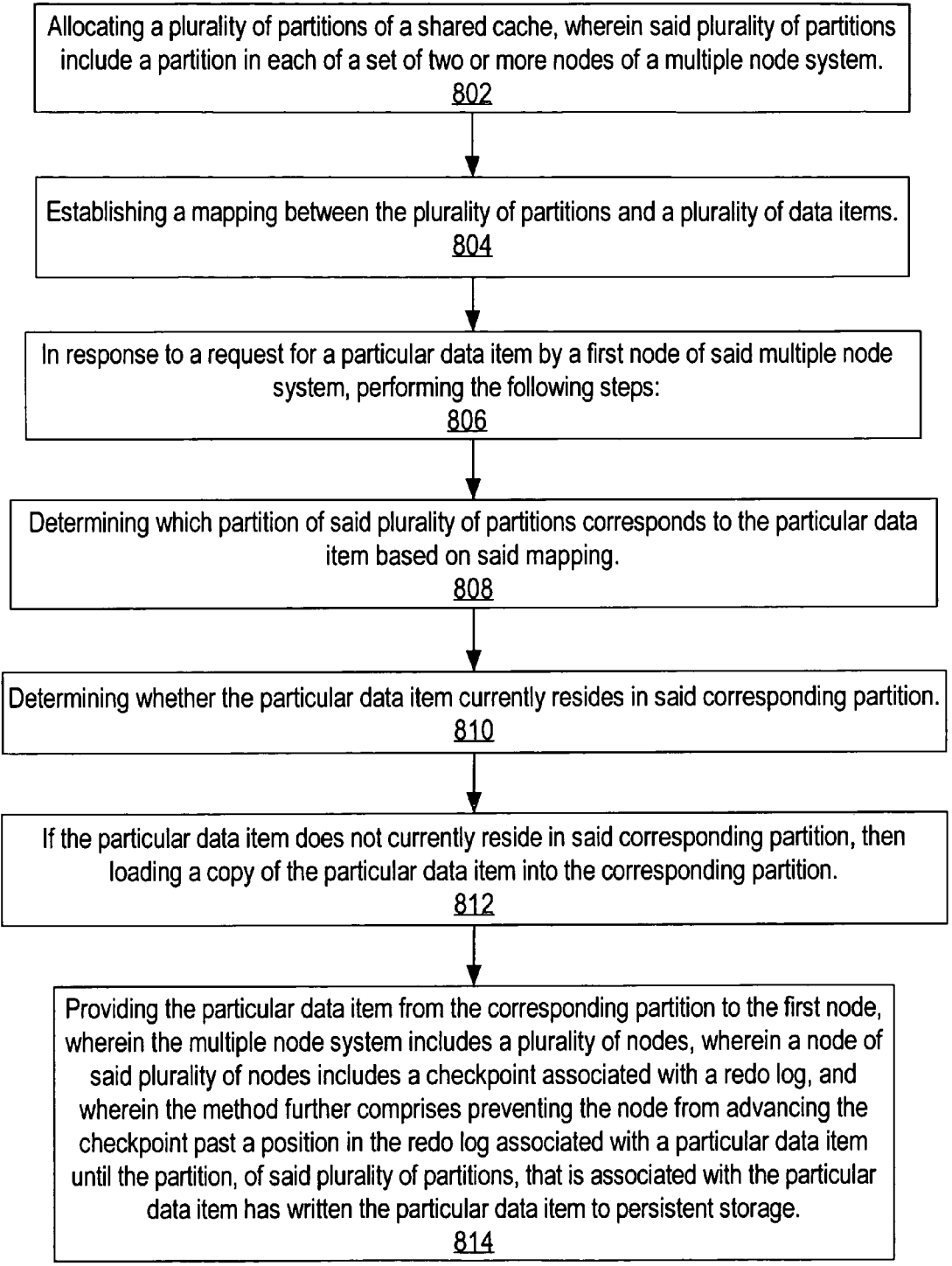
FIG. 8 is a flow diagram of a method for managing data, according to an embodiment of the invention.

FIG. 8 is a flow diagram of a method for managing data, according to an embodiment of the invention. At step 802, a plurality of partitions of a shared cache are allocated, wherein said plurality of partitions include a partition in each of a set of two or more nodes of a multiple node system. At step 804, a mapping is established between the plurality of partitions and a plurality of data items. At step 806, in response to a request for a particular data item by a first node of said multiple node system, the following steps are performed. At step 808, it is determined which partition of said plurality of partitions corresponds to the particular data item based on said mapping. At step 810, it is determined whether the particular data item currently resides in said corresponding partition. At step 812, if the particular data item does not currently reside in said corresponding partition, then a copy of the particular data item is loaded into the corresponding partition. At step 814, the particular data item is provided from the corresponding partition to the first node, wherein the multiple node system includes a plurality of nodes, wherein a node of said plurality of nodes includes a checkpoint associated with a redo log, and wherein the method further comprises preventing the node from advancing the checkpoint past a position in the redo log associated with a particular data item until the partition, of said plurality of partitions, that is associated with the particular data item has written the particular data item to persistent storage.

Figure 9:
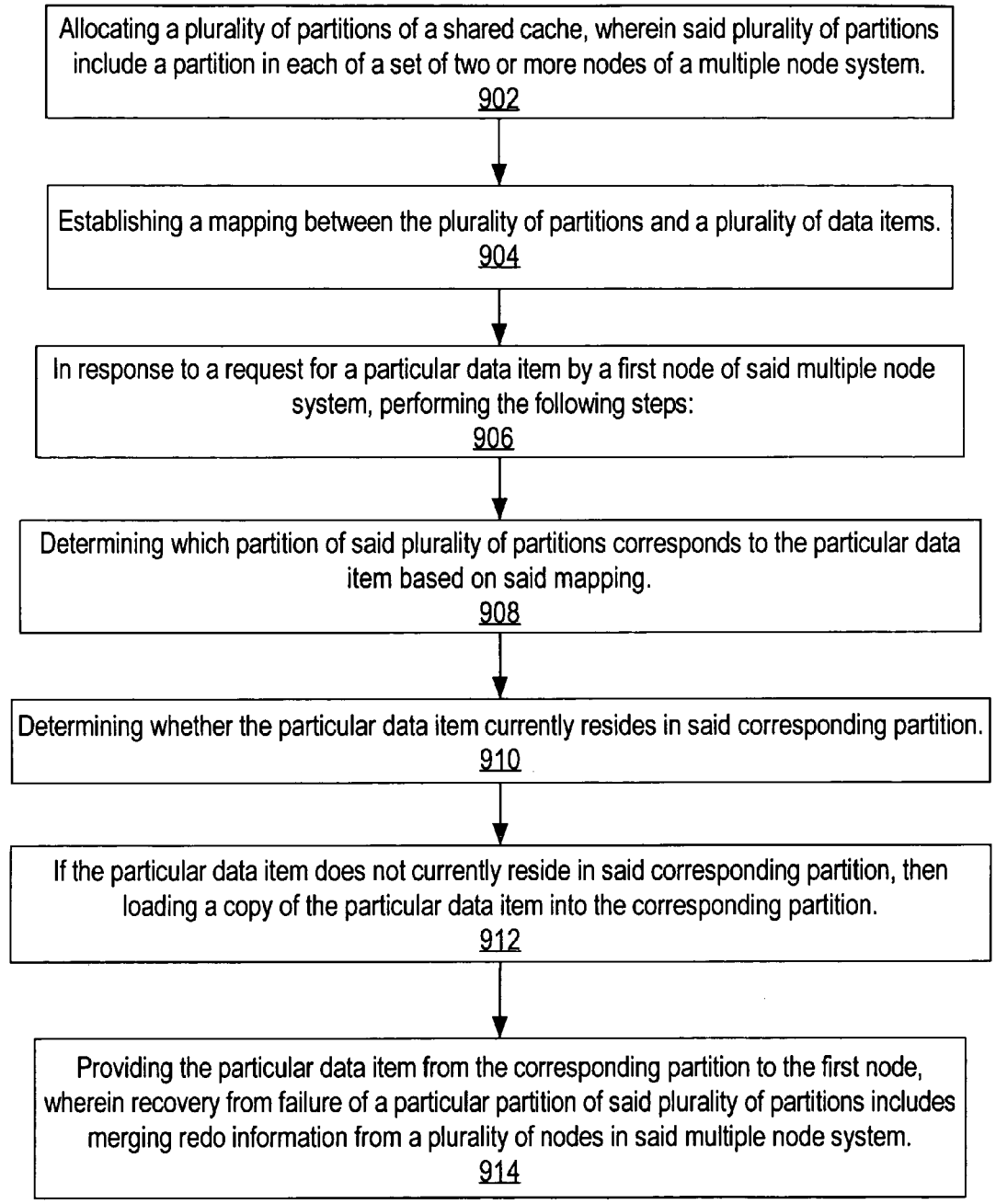
FIG. 9 is a flow diagram of a method for managing data, according to an embodiment of the invention.

FIG. 9 is a flow diagram of a method for managing data, according to an embodiment of the invention. At step 902, a plurality of partitions of a shared cache are allocated, wherein said plurality of partitions include a partition in each of a set of two or more nodes of a multiple node system. At step 904, a mapping is established between the plurality of partitions and a plurality of data items. At step 906, in response to a request for a particular data item by a first node of said multiple node system, the following steps are performed. At step 908, it is determined which partition of said plurality of partitions corresponds to the particular data item based on said mapping. At step 910, it is determined whether the particular data item currently resides in said corresponding partition. At step 912, if the particular data item does not currently reside in said corresponding partition, then a copy of the particular data item is loaded into the corresponding partition. At step 914, the particular data item is provided from the corresponding partition to the first node, wherein recovery from failure of a particular partition of said plurality of partitions includes merging redo information from a plurality of nodes in said multiple node system.

Hardware Overview

Figure 2:
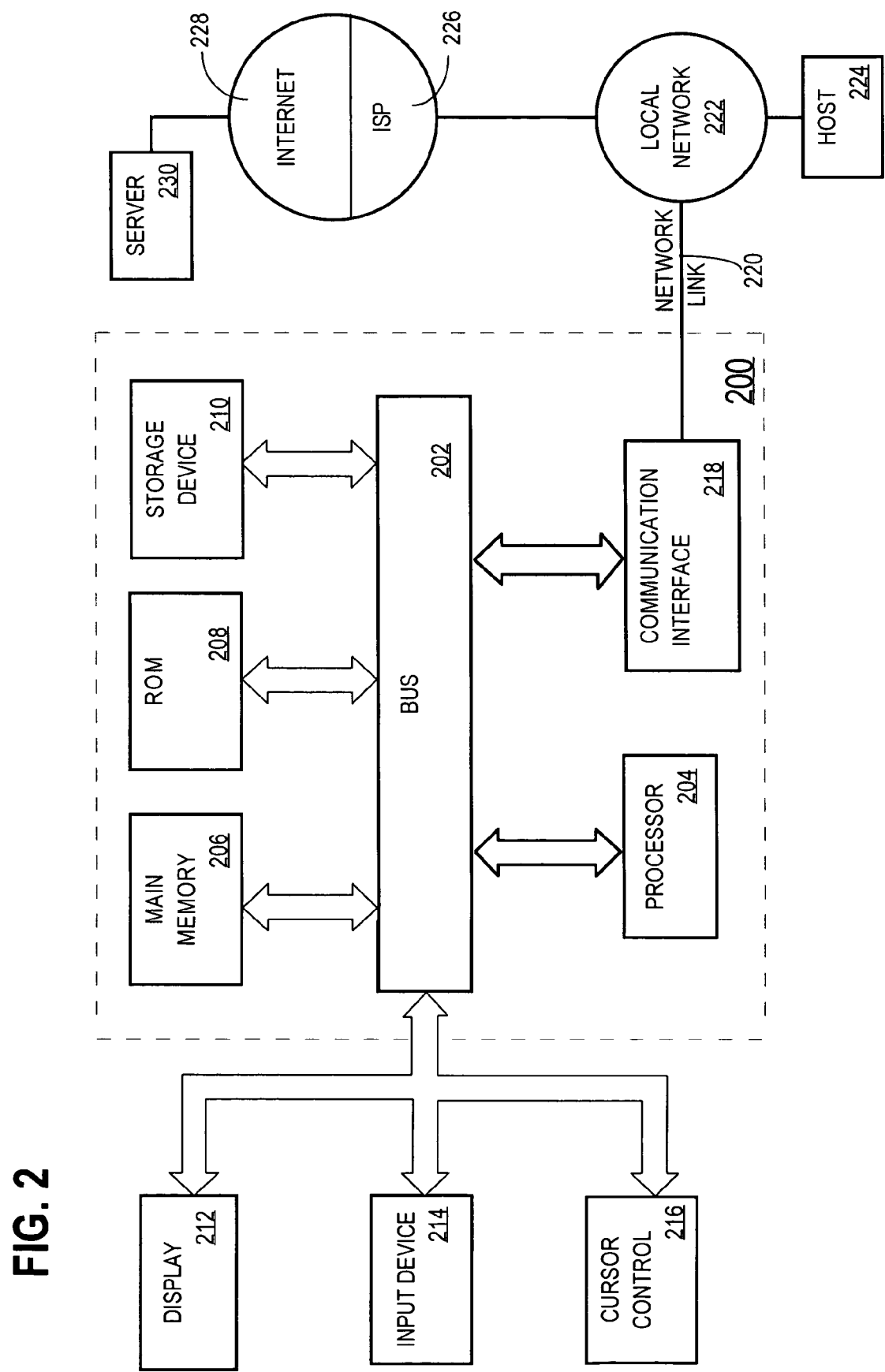
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may including but not limited to storage media including non-volatile media and transmission media such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense, and command selec-tions to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, storage media including non-volatile media, and volatile media and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

What is claimed is:

1. A method for managing data, the method comprising the steps of:

allocating a plurality of partitions of a shared cache, wherein said plurality of partitions include a partition in each of a set of two or more nodes of a multiple node system;

establishing a mapping between the plurality of partitions and a plurality of data items; and in response to a request for a particular data item by a first node of said multiple node system, performing the steps of determining which partition of said plurality of partitions corresponds to the particular data item based on said mapping;

determining whether the particular data item currently resides in said corresponding partition;

if the particular data item does not currently reside in said corresponding partition, then loading a copy of the particular data item into the corresponding partition; and providing the particular data item from the corresponding partition to the first node;

wherein a dirty version of the particular data item resides in a second node of the multiple node system; and wherein the step of loading a copy of the particular data item into the corresponding partition includes loading the dirty version of the particular data item from the second node into the corresponding partition.

2. The method of claim 1 wherein the step of providing the particular data item includes the first node reading the data item from the corresponding partition.

3. The method of claim 1 wherein the step of providing the particular data item includes the particular data item being sent from the corresponding partition to the first node.

4. The method of claim 1 wherein the corresponding partition resides on a second node of said multiple node system that is different than said first node.

5. The method of claim 1, wherein the multiple node system includes one or more nodes that use said shared cache but do not themselves have any partition of said shared cache.

6. A method for managing data, the method comprising the steps of:
   allocating a plurality of partitions of a shared cache, wherein said plurality of partitions include a partition in each of a set of two or more nodes of a multiple node system;
   establishing a mapping between the plurality of partitions and a plurality of data items; and
   in response to a request for a particular data item by a first node of said multiple node system, performing the steps of
      determining which partition of said plurality of partitions corresponds to the particular data item based on said mapping;
      determining whether the particular data item currently resides in said corresponding partition;
      if the particular data item does not currently reside in said corresponding partition, then loading a copy of the particular data item into the corresponding partition; and
      providing the particular data item from the corresponding partition to the first node;
   wherein each partition of said plurality of partitions maintains lock structures for data items that correspond to the partition based on the mapping; and
   wherein the method includes gathering information from each partition of the plurality of partitions to construct wait-for-graphs to perform deadlock detection.

7. A tangible computer-readable storage medium carrying one or more sequences of instructions which, when executed by one or more processors, causes the one or more processors to perform the method recited in claim 1.

8. The method of claim 1 wherein the step of establishing a mapping includes:
   establishing the mapping by performing a hash operation on hash keys to produce hash values; and
   establishing the mapping based on the hash values.

9. The method of claim 8 wherein at least a portion of the hash keys are identifiers associated with data items.

10. A method for managing data, the method comprising the steps of:
    allocating a plurality of partitions of a shared cache, wherein said plurality of partitions include a partition in each of a set of two or more nodes of a multiple node system;
    establishing a mapping between the plurality of partitions and a plurality of data items by performing a hash operation on hash keys to produce hash values, wherein at least a portion of the hash keys are identifiers associated with persistent storage devices and the mapping is based on the hash values; and
    in response to a request for a particular data item by a first node of said multiple node system, performing the steps of
       determining which partition of said plurality of partitions corresponds to the particular data item based on said mapping;
       determining whether the particular data item currently resides in said corresponding partition;
       if the particular data item does not currently reside in said corresponding partition, then loading a copy of the particular data item into the corresponding partition; and
       providing the particular data item from the corresponding partition to the first node.

11. The method of claim 10 wherein the step of establishing a mapping includes mapping each partition to only data items that persistently reside on storage devices that can be directly accessed by the node on which the partition resides.

12. A method for managing data, the method comprising the steps of:
    allocating a plurality of partitions of a shared cache, wherein said plurality of partitions include a partition in each of a set of two or more nodes of a multiple node system;
    establishing a mapping between the plurality of partitions and a plurality of data items; and
    in response to a request for a particular data item by a first node of said multiple node system, performing the steps of
       determining which partition of said plurality of partitions corresponds to the particular data item based on said mapping;
       determining whether the particular data item currently resides in said corresponding partition;
       if the particular data item does not currently reside in said corresponding partition, then loading a copy of the particular data item into the corresponding partition; and
       providing the particular data item from the corresponding partition to the first node;
    wherein recovery from failure of a particular partition of said plurality of partitions includes recovering a data item that resided in said particular partition based on a current version of the data item from a node-private cache of a surviving node of said multiple node system.

13. The method of claim 12 further comprising:
    in response to a change made by the surviving node to the data item, generating redo information associated with the change; and
    preventing the surviving node from sending the data item for recovery until the redo information is flushed to persistent storage.

14. A method for managing data, the method comprising the steps of:
    allocating a plurality of partitions of a shared cache, wherein said plurality of partitions include a partition in each of a set of two or more nodes of a multiple node system;
    establishing a mapping between the plurality of partitions and a plurality of data items; and
    in response to a request for a particular data item by a first node of said multiple node system, performing the steps of
       determining which partition of said plurality of partitions corresponds to the particular data item based on said mapping;
       determining whether the particular data item currently resides in said corresponding partition;

if the particular data item does not currently reside in said corresponding partition, then loading a copy of the particular data item into the corresponding partition; and providing the particular data item from the corresponding partition to the first node wherein:

the multiple node system includes a plurality of nodes;

a node of said plurality of nodes includes a checkpoint associated with a redo log; and the method further comprises preventing the node from advancing the checkpoint past a position in the redo log associated with a particular data item until the partition, of said plurality of partitions, that is associated with the particular data item has written the particular data item to persistent storage.

15. A method for managing data, the method comprising the steps of:

allocating a plurality of partitions of a shared cache, wherein said plurality of partitions include a partition in each of a set of two or more nodes of a multiple node system;

establishing a mapping between the plurality of partitions and a plurality of data items; and in response to a request for a particular data item by a first node of said multiple node system, performing the steps of determining which partition of said plurality of partitions corresponds to the particular data item based on said mapping;

determining whether the particular data item currently resides in said corresponding partition;

if the particular data item does not currently reside in said corresponding partition, then loading a copy of the particular data item into the corresponding partition; and providing the particular data item from the corresponding partition to the first node;

wherein recovery from failure of a particular partition of said plurality of partitions includes merging redo information from a plurality of nodes in said multiple node system.

16. The method of claim 15 wherein recovery from failure of a particular partition of said plurality of partitions includes recovering a first subset of data items that map to said failed partition based on current versions of data items that reside in node-private caches of nodes, in said multiple node system, that have not failed; and recovering a second subset of data items that map to said failed partition based on redo information created by merging redo from a plurality of nodes in said multiple node system.

17. The method of claim 6 further comprising:

in response to a change made by a node to a data item, generating redo information associated with the change; and preventing the node from sending a data item to another node until the redo information is flushed to persistent storage.

18. A tangible computer-readable storage medium carrying one or more sequences of instructions which, when executed by one or more processors, causes the one or more processors to perform the method recited in claim 17.

19. A tangible computer-readable storage medium carrying one or more sequences of instructions which, when executed by one or more processors, causes the one or more processors to perform the method recited in claim 2.

20. A tangible computer-readable storage medium carrying one or more sequences of instructions which, when executed by one or more processors, causes the one or more processors to perform the method recited in claim 3.

21. A tangible computer-readable storage medium carrying one or more sequences of instructions which, when executed by one or more processors, causes the one or more processors to perform the method recited in claim 4.

22. A tangible computer-readable storage medium carrying one or more sequences of instructions which, when executed by one or more processors, causes the one or more processors to perform the method recited in claim 5.

23. A tangible computer-readable storage medium carrying one or more sequences of instructions which, when executed by one or more processors, causes the one or more processors to perform the method recited in claim 6.

24. A tangible computer-readable storage medium carrying one or more sequences of instructions which, when executed by one or more processors, causes the one or more processors to perform the method recited in claim 16.

25. A tangible computer-readable storage medium carrying one or more sequences of instructions which, when executed by one or more processors, causes the one or more processors to perform the method recited in claim 8.

26. A tangible computer-readable storage medium carrying one or more sequences of instructions which, when executed by one or more processors, causes the one or more processors to perform the method recited in claim 9.

27. A tangible computer-readable storage medium carrying one or more sequences of instructions which, when executed by one or more processors, causes the one or more processors to perform the method recited in claim 10.

28. A tangible computer-readable storage medium carrying one or more sequences of instructions which, when executed by one or more processors, causes the one or more processors to perform the method recited in claim 11.

29. A tangible computer-readable storage medium carrying one or more sequences of instructions which, when executed by one or more processors, causes the one or more processors to perform the method recited in claim 12.

30. A tangible computer-readable storage medium carrying one or more sequences of instructions which, when executed by one or more processors, causes the one or more processors to perform the method recited in claim 13.

31. A tangible computer-readable storage medium carrying one or more sequences of instructions which, when executed by one or more processors, causes the one or more processors to perform the method recited in claim 14.

32. A tangible computer-readable storage medium carrying one or more sequences of instructions which, when executed by one or more processors, causes the one or more processors to perform the method recited in claim 15.

* * * * *